United States Patent Office 2,928,385
Patented Mar. 15, 1960

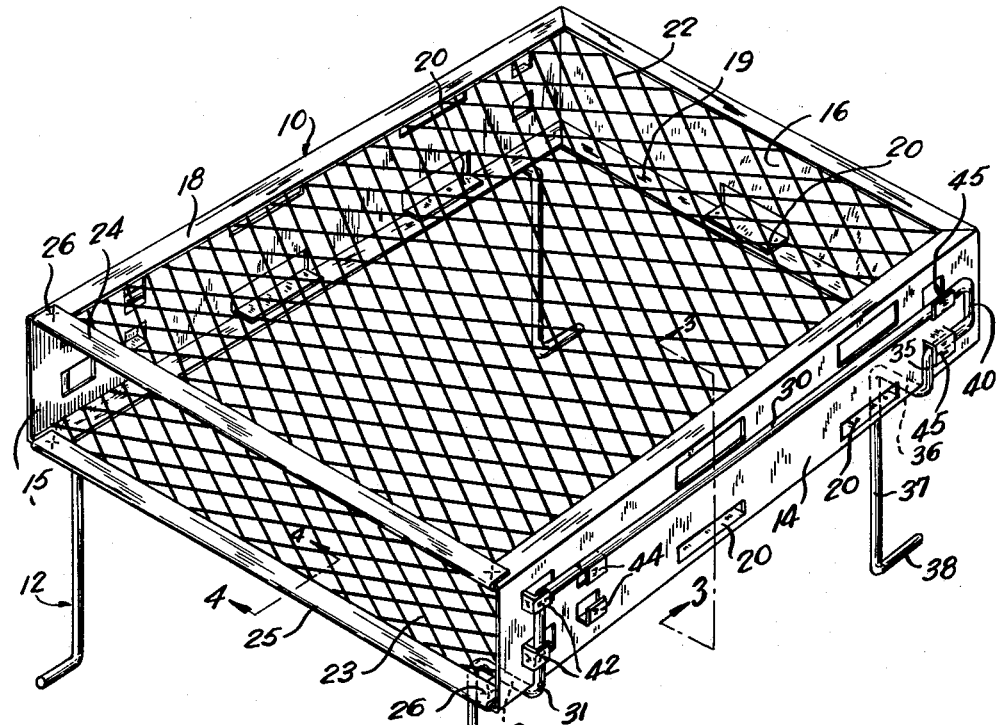
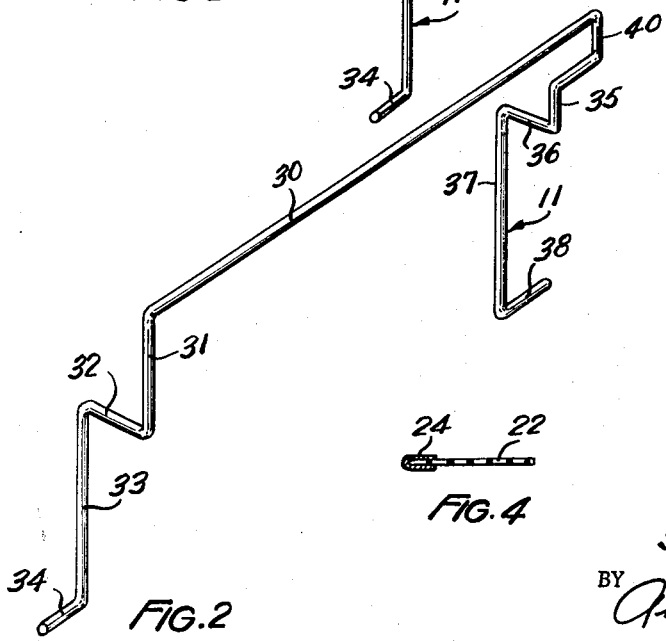
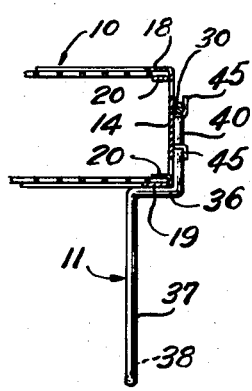

2,928,385

PORTABLE GRILL

Stephen C. Peplin, Cleveland, Ohio, assignor to Lakewood Manufacturing Co., Westlake, Ohio, a corporation of Ohio Application May 21, 1958, Serial No. 736,862

2 Claims. (Cl. 126—25)

This invention relates to portable grills and is in the same general class with the invention that constitutes the subject matter of my United States Letters Patent No. 2,774,345, dated December 18, 1956.

Among the objects of my present invention are: to provide a portable grill of the knockdown variety comprising a fire basket and two leg members or supports that are detachably fastened to the fire basket for supporting the same in a horizontal operative position; to provide a device of this description that is especially convenient of assembly and disassembly in that the leg members or supports are shaped adjacent their upper ends for engagement with the sides of the fire basket, in a given relation to holding parts that project from the sides of the basket, said members or supports being shiftable lengthwise of the basket into holding engagement with said parts; to provide a portable grill of the character just described wherein the leg members or supports are of a size and shape that will permit both to be readily inserted into the fire basket so as to render the grill compact and of relatively small compass, thereby to facilitate carrying and storing of the device, and to provide a portable, knockdown grill that is of simple construction, relatively inexpensive to manufacture, and durable in service.

The foregoing objects, with others hereinafter appearing, are attained in the embodiment of the invention illustrated in the accompanying drawing. This embodiment, however, is to be taken as illustrative rather than as limiting, it being understood that the invention is susceptible to such changes and modifications as fall within the scope of the claims appended hereto.

In the drawing:

Figure 1 is a perspective view of my improved portable grill;

Figure 2 is a similar view of one of the leg members or supports, and

Figures 3 and 4 are sectional details taken on the respective lines 3—3 and 4—4 of Figure 1.

The fire basket is designated generally by the reference numeral 10, and it is sustained at a proper elevation above the ground or other supporting surface, and in a horizontal position, by the leg members or supports, generally designated 11 and 12.

The fire basket 10 is similar to the one disclosed in the above mentioned patent. It includes side walls 14 and 15, and an end wall 16. The basket is open at its end opposite the wall 16 for the introduction of fuel, such as charcoal, and the removal of coarse ash and chunks of unburned fuel.

The walls 14, 15 and 16 are desirably integral parts of an elongated strip of heat resistant sheet metal of suitable gauge, and the lateral edges of the strip are turned over to provide top and bottom flanges 18 and 19, respectively. Lugs 20 are struck from the sheet metal walls 14, 15 and 16, adjacent the top and bottom flanges 18 and 19 and are turned inwardly in parallel spaced relation to the adjacent portions of said flanges. The fire basket includes, also rectangular top and bottom walls 22 and 23, respectively, and at least the top wall is foraminous. In fact, both are disclosed as consisting of pieces of relatively heavy wire mesh. Edge portions of the top and bottom walls 22 and 23 are confined between the respective flanges 18 and 19, and the several lugs 20 that are adjacent said flanges. The ends of the top and bottom walls 22 and 23, remote from the end wall 16, are bound by the respective metal channels 24 and 25, and it will be observed that the ends of these channels embrace the adjacent ends of the flanges 18 and 19, and are secured thereto by suitable means, as by spot welding, as indicated at 26.

In their present preferred form, the opposed leg members or supports 11 and 12 are mirror images of each other, and each is constructed of a single piece of rod or wire of suitable gauge and stiffness. Each of said members or supports includes a longitudinal bar 30 which defines the top of the member or support, and said bar joins, at its forward end, a vertical column 31. Extending inwardly at right angles to the plane of said bar and column is a ledge 32, and depending from the inner end of the ledge is a leg 33. Shown as extending from the lower end of the latter, at right angles thereto, is a foot 34. At the opposite end of the longitudinal bar 30, the rod or wire has a reverse bend that terminates in a vertical column 35, which joins, at its lower end, an inwardly turned ledge 36, from the inner end of which depends a leg 37 that terminates at its lower end in a foot 38. The aforesaid reverse bend will be referred to as a loop 40.

Struck from the forward end portion of each of the side walls 14 and 15 are vertically spaced tongues that are angularly shaped to provide rearwardly opening clips 42. Being constructed of the sheet metal from which said walls are formed, the clips are resilient and are spaced outwardly from the plane of the walls a distance approximating the diameter of the wire or rod from which the leg members or supports are constructed. Spaced rearwardly a suitable distance from the open sides of the clips 42 are stops 44 which are also formed from tongues that are struck from the side walls.

Further tongues are struck from said walls near their rear ends. These tongues join the side walls along the adjacent ends of the resultant openings in said walls, and the tongues are turned outwardly and thence vertically in opposite directions to provide a set of clips 45.

For the sake of compactness, when the grill is to be stored or carried, the leg members or supports 11 and 12 may be inserted lengthwise into the fire basket through the open end of the latter, it being noted that said members or supports are of substantially the same length as the basket.

In setting up the grill, the top portions of the leg members or supports 11 and 12 are engaged flatwise against the side walls 14 and 15 of the fire basket 10 and are so related to the basket that the ledges 32 and 36 project beneath and in supporting relation to the basket. At this stage of assembly, the forward end of the longitudinal bar 30 of each member or support should be disposed immediately above the upper stop 44; the column 31 should be closely adjacent both stops 44; the portion of the bar 30 contiguous to the loop 40 should be engaged within the top clip 45, and the loop 40 should repose rearwardly of the upper and lower clips 45.

Now, in order to secure each leg member or support to the fire basket, the member or support is shifted forwardly along the adjacent side wall until the column 31 is received and firmly held by the clips 42, and the top and bottom sides of the loop 40 snugly occupy the upper and lower clips 45.

It will be observed that each side wall of the fire basket is symmetrical above and below its longitudinal center. Therefore, the basket may be inverted without changing the relation of the cooperating parts of the side walls and leg members or supports.

I claim:

1. A portable grill comprising a fire basket including horizontal rectangular top and bottom walls, and sheet metal side walls connecting the lateral edges of the former walls, the top wall being foraminous, vertically disposed clip means integral with and extending outwardly from each side wall adjacent one end thereof and opening toward the opposite end of said wall, a set of vertically spaced angular clips extending from each side wall adjacent the end thereof remote from said clip means, the upper and lower clips of each set opening upwardly and downwardly, respectively, and opposed leg members for supporting the fire basket in a horizontal position, each leg member being fabricated of a continuous piece of wire and including a longitudinal bar that defines the top of said member, a vertical column depending from one end of said bar, a ledge extending horizontally under the basket from the lower end of the column, a leg depending from the inner end of the ledge, the opposite end of the longitudinal bar merging into a reverse bend providing a loop, a relatively short vertical column depending from the lower end of the loop, a ledge extending horizontally under the basket from said short column in the horizontal plane of the former ledge, a second leg depending from the inner end of the second ledge, the basket being adapted to rest upon the ledges of the opposed leg members with the first mentioned columns of said members occupying the clip means of the side walls, and the top and bottom sides of the loops of the leg members occupying the clips of said side walls said opposed members being slidable longitudinally along the respective side walls of the basket into holding engagement with said clips and clip means and in supporting position for the basket, and slidable in a longitudinal direction of the basket to disassemble the leg members from the basket.

2. A portable grill comprising a fire basket including horizontal rectangular top and bottom walls, and sheet metal side walls connecting the lateral edges of the former walls, the top wall being foraminous, angular clip means integral with and extending outwardly from each side wall adjacent one end thereof and opening toward the opposite end of said wall, stop means projecting from each side wall in spaced relation to the open side of said clip means, a set of vertically spaced angular clips extending from each side wall adjacent the end thereof remote from said clip means, the upper and lower clips of said set opening upwardly and downwardly, respectively, and opposed leg members for supporting the fire basket in a horizontal position, each leg member being fabricated of a continuous piece of wire and including a longitudinal bar that defines the top of said member, a vertical column depending from one end of said bar, a ledge extending horizontally under the basket from the lower end of the column, a leg depending from the inner end of the ledge; the opposite end of the longitudinal bar merging into a reverse bend providing a loop, a relatively short vertical column depending from the lower end of the loop, a ledge extending horizontally under the basket from said short column in the horizontal plane of the former ledge, a second leg depending from the inner end of the second ledge; the basket being adapted to rest upon the ledges of the opposed leg members with the first mentioned columns of said members occupying the clip means of the side walls, and the top and bottom sides of the loops of the leg members occupying the clips of said side walls, the longitudinal bar of each leg member being disposed immediately above the stop means of the corresponding side walls said leg members being slidable longitudinally in one direction along and in contact with the side walls of the basket into holding engagement with the clips and clip means, and in an opposite direction longitudinally of the basket for disengagement of the clips and clip means as in disassembling the grill.

References Cited in the file of this patent

UNITED STATES PATENTS

| | | |
|---|---|---|
| 828,801 | Baxter | Aug. 14, 1906 |
| 1,467,815 | Roemer | Sept. 11, 1923 |
| 1,476,542 | Rasmussen | Dec. 4, 1923 |
| 2,048,769 | Anderson | July 28, 1936 |
| 2,158,236 | Haislip | May 16, 1939 |
| 2,158,805 | Smith | May 16, 1939 |
| 2,573,211 | Manzler | Oct. 30, 1951 |
| 2,768,044 | Jaffe | Oct. 23, 1956 |
| 2,821,186 | Peplin | Jan. 28, 1958 |